United States Patent
Shimoda et al.

(10) Patent No.: US 6,530,291 B1
(45) Date of Patent: Mar. 11, 2003

(54) AUTOMATIC SHIFT-DOWN APPARATUS FOR AUTOMATIC TRANSMISSION

(75) Inventors: Hajime Shimoda, Toyota (JP); Makoto Ohmori, Nagoya (JP)

(73) Assignee: Aisin Ai Co., Ltd., Nishio (JP)

( * ) Notice: Subject to any disclaimer, the term of this patent is extended or adjusted under 35 U.S.C. 154(b) by 38 days.

(21) Appl. No.: 09/696,173

(22) Filed: Oct. 26, 2000

(30) Foreign Application Priority Data

Nov. 8, 1999 (JP) .......................................... 11-317543

(51) Int. Cl.$^7$ .............................................. F16H 51/00
(52) U.S. Cl. ..................... 74/336 R; 477/904; 477/154; 701/55
(58) Field of Search ......................... 74/336 R, 473.12; 477/904, 143, 154; 701/66, 55

(56) References Cited

U.S. PATENT DOCUMENTS

| | | | | |
|---|---|---|---|---|
| 4,361,060 A | * | 11/1982 | Smyth .......................... | 477/120 |
| 5,568,748 A | * | 10/1996 | Carlson et al. ............... | 477/120 |
| 5,928,109 A | * | 7/1999 | Allen, Jr. et al. ............. | 477/111 |
| 5,951,437 A | * | 9/1999 | Yuasa et al. .................. | 477/46 |
| 5,954,776 A | * | 9/1999 | Saito et al. .................... | 701/51 |
| 6,098,002 A | * | 8/2000 | Horiguchi et al. ........... | 477/120 |
| 6,109,407 A | * | 8/2000 | Bockmann et al. ......... | 192/3.63 |
| 6,269,293 B1 | * | 7/2001 | Correa et al. ................ | 477/109 |

FOREIGN PATENT DOCUMENTS

| | | |
|---|---|---|
| EP | 0 313 286 | 4/1989 |
| JP | 62-12050 | 3/1987 |

* cited by examiner

Primary Examiner—Sherry Estremsky
Assistant Examiner—Eric M Williams
(74) Attorney, Agent, or Firm—Oblon, Spivak, McClelland, Maier & Neustadt, P.C.

(57) ABSTRACT

An automatic shift-down apparatus for an automatic transmission which comprises vehicle speed detection device for detecting the speed of a vehicle; vehicle-speed variation rate calculation device for calculating the variation rate of the detected vehicle speed; shift-start vehicle speed calculation device for calculating, on the basis of the calculated vehicle-speed variation rate and a time required to complete a shift operation, a shift-start vehicle speed which enables the shift operation to finish before the vehicle speed attains a shift-completion speed; and a shift device which starts a shift operation when the detected vehicle speed attains the calculated shift-start vehicle speed.

13 Claims, 2 Drawing Sheets

NOTE) *A: JUDGMENT MAY BE MADE WITH A CERTAIN TOLERANCE

NOTE) *A: JUDGMENT MAY BE MADE WITH A CERTAIN TOLERANCE

AUTOMATIC SHIFT-DOWN APPARATUS FOR AUTOMATIC TRANSMISSION

BACKGROUND OF THE INVENTION

1. Field of the Invention

This invention relates to an automatic shift-down apparatus for an automatic transmission which comprises vehicle speed detection means for detecting the speed of a vehicle; vehicle-speed variation rate calculation means for calculating the variation rate of the detected vehicle speed; shift-start vehicle speed calculation means for calculating, on the basis of the calculated vehicle-speed variation rate and a time required to complete a shift operation, a shift-start vehicle speed which enables the shift operation to finish before the vehicle speed attains a shift-completion speed; and a shift device which starts a shift operation when the detected vehicle speed attains the calculated shift-start vehicle speed.

2. Description of the Prior Art

In a conventional electronic-control automatic transmission which utilizes a manual transmission and which is operated by means of hydraulic pressure or a motor, when a driver decelerates or stops the vehicle while maintaining a certain shift position, the transmission must be automatically shifted down to a certain lower gear before the vehicle stops, in order to enable smooth resumption of travel.

The above-described conventional electronic-control automatic transmission has the following drawback. Since gear changes are performed in a constant manner, in some cases, the vehicle cannot resume travel smoothly, because the deceleration of the vehicle varies depending on the driver and surrounding conditions.

SUMMARY OF THE INVENTION

It is a general object of the present invention to provide an automatic shift-down apparatus for an automatic transmission which enables changeover of the operation time (or the speed) of an automatic shift-down operation depending on the variation rate of vehicle speed and to enable the automatic shift-down operation to be performed at an optimal timing which is determined on the basis of driving conditions, to thereby improve the drive feeling.

It is a more specific object of the present invention to provide an automatic shift-down apparatus and method for an automatic transmission in which the variation rate of a detected vehicle speed is calculated; on the basis of the calculated variation rate of vehicle speed and a time required to complete a shift operation, there is calculated a shift-start vehicle speed which enables the shift operation to finish before the vehicle speed attains a shift-completion speed; and when the detected vehicle speed attains the calculated shift-start vehicle speed, the shift operation is started.

It is another object of the present invention to provide an automatic shift-down apparatus for an automatic transmission characterized by comprising: vehicle speed detection means for detecting the speed of a vehicle; vehicle-speed variation rate calculation means for calculating the variation rate of the detected vehicle speed; shift-start vehicle speed calculation means for calculating, on the basis of the calculated vehicle-speed variation rate and a time required to complete a shift operation, a shift-start vehicle speed which enables the shift operation to finish before the vehicle speed attains a shift-completion speed; and a shift device which starts a shift operation when the detected vehicle speed attains the calculated shift-start vehicle speed.

It is still another object of the present invention to provide an automatic shift-down apparatus for an automatic transmission characterized by further comprising first vehicle-speed variation rate calculation means for calculating the first variation rate of vehicle speed when the detected vehicle speed has attained the calculated shift-start vehicle speed.

It is a further object of the present invention to provide an automatic shift-down apparatus for an automatic transmission characterized by further comprising vehicle-speed variation rate storage means for storing the calculated vehicle-speed variation rate of the vehicle speed when the detected vehicle speed has attained the calculated shift-start vehicle speed.

It is a still further object of the present invention to provide an automatic shift-down apparatus for an automatic transmission characterized by further comprising second vehicle-speed variation rate calculation means for calculating the second variation rate of vehicle speed after the detected vehicle speed has attained the calculated shift-start vehicle speed.

It is a yet further object of the present invention to provide an automatic shift-down apparatus for an automatic transmission characterized by further comprising comparison means for comparing the second calculated vehicle-speed variation rate after the detected vehicle speed has attained the calculated shift-start vehicle speed with the first calculated vehicle-speed variation rate stored in the vehicle-speed variation rate storage means.

It is a yet further object of the present invention to provide an automatic shift-down apparatus for an automatic transmission further comprising shift speed control means for controlling the speed of the shift operation in accordance with the result of comparison performed by the comparison means which indicates whether the second vehicle-speed variation rate after attainment of the shift-start vehicle speed is greater or less than the first vehicle-speed variation rate at the time of attainment of the shift-start vehicle speed.

It is another object of the present invention to provide an automatic shift-down apparatus for an automatic transmission characterized in that when the calculated vehicle-speed variation rate indicates that the vehicle comes into an accelerating state after the initiation of the shift operation, the transmission is shifted to a gear in response to the vehicle speed.

It is a further object of the present invention to provide an automatic shift-down method for an automatic transmission comprising: calculating the variation rate of a detected vehicle speed; calculating a shift-start vehicle speed which enables the shift operation to finish before the vehicle speed attains a shift-completion speed, on the basis of the calculated vehicle-speed variation rate and a time required to complete a shift operation; and starting a shift operation when the detected vehicle speed attains the calculated shift-start vehicle speed.

In the automatic shift-down apparatus for an automatic transmission according to the present invention, the vehicle speed detection means detects the speed of a vehicle; the vehicle-speed variation rate calculation means calculates the variation rate of the detected vehicle speed; the shift-start vehicle speed calculation means calculates, on the basis of the calculated vehicle-speed variation rate and a time required to complete a shift operation, a shift-start vehicle speed which enables the shift operation to finish before the vehicle speed attains a shift-completion speed; and the shift device starts a shift operation when the detected vehicle speed attains the calculated shift-start vehicle speed.

Therefore, the automatic shift-down apparatus for an automatic transmission according to the present invention has an advantage such that the operation time (or the speed) of the automatic shift-down operation can be switched depending on the variation rate of vehicle speed.

In the automatic shift-down apparatus for an automatic transmission according to the present invention, the first vehicle-speed variation rate calculation means calculates the variation rate of vehicle speed when the detected vehicle speed has attained the calculated shift-start vehicle speed.

Therefore, the automatic shift-down apparatus for an automatic transmission according to the present invention has an advantage such that the shift control can be performed on the basis of the variation rate of vehicle speed when the detected vehicle speed has attained the shift-start vehicle speed.

In the automatic shift-down apparatus for an automatic transmission according to the present invention, the vehicle-speed variation rate storage means stores the calculated vehicle-speed variation rate of the vehicle speed when the detected vehicle speed has attained the calculated shift-start vehicle speed.

Therefore, the automatic shift-down apparatus for an automatic transmission according to the present invention has an advantage such that the stored vehicle-speed variation rate of the vehicle speed, when the detected vehicle speed has attained the shift-start vehicle speed, can be used after attainment of the shift-start vehicle speed.

In the automatic shift-down apparatus for an automatic transmission according to the present invention, the second vehicle-speed variation rate calculation means calculates the second variation rate of vehicle speed after the detected vehicle speed has attained the calculated shift-start vehicle speed.

Therefore, the automatic shift-down apparatus for an automatic transmission according to the present invention has an advantage such that the shift control can be performed on the basis of the variation rate of vehicle speed after the vehicle speed has attained the shift-start vehicle speed.

In the automatic shift-down apparatus for an automatic transmission according to the present invention, the comparison means compares the second calculated vehicle-speed variation rate after the detected vehicle speed has attained the calculated shift-start vehicle speed with the first calculated vehicle-speed variation rate stored in the vehicle-speed variation rate storage means.

Therefore, the automatic shift-down apparatus for an automatic transmission according to the present invention has an advantage such that the shift control can be performed on the basis of the result of comparison.

In the automatic shift-down apparatus for an automatic transmission according to the present invention, the shift speed control means controls the speed of the shift operation in accordance with the result of comparison performed by the comparison means which indicates whether the second vehicle-speed variation rate after attainment of the shift-start vehicle speed is greater or less than the first vehicle-speed variation rate at the time of attainment of the shift-start vehicle speed.

Therefore, the automatic shift-down apparatus for an automatic transmission according to the present invention has an advantage such that the automatic shift-down operation can be performed at an optimal timing which is determined on the basis of driving conditions, to thereby improve drive feeling.

In the automatic shift-down apparatus for an automatic transmission according to the present invention, when the calculated vehicle-speed variation rate indicates that the vehicle comes into an accelerating state after the initiation of the shift operation, the transmission is shifted to a gear in response to the vehicle speed.

Therefore, the automatic shift-down apparatus for an automatic transmission according to the present invention has an advantage such that the gear shift can be performed in consideration of variations in conditions.

In the automatic shift-down method for an automatic transmission according to the present invention, the variation rate of a detected vehicle speed is calculated; on the basis of the calculated vehicle-speed variation rate and a time required to complete a shift operation, a shift-start vehicle speed is calculated such that the shift operation can finish before the vehicle speed attains a shift-completion speed; and a shift operation is started when the detected vehicle speed attains the calculated shift-start vehicle speed.

Therefore, the automatic shift-down method according to the present invention has an advantage such that the operation time (or the speed) of the automatic shift-down operation can be switched depending on the variation rate of vehicle speed.

DESCRIPTION OF THE PREFERRED EMBODIMENTS

An embodiment of the present invention will be described with reference to the drawings.

Embodiment

Figure 1:
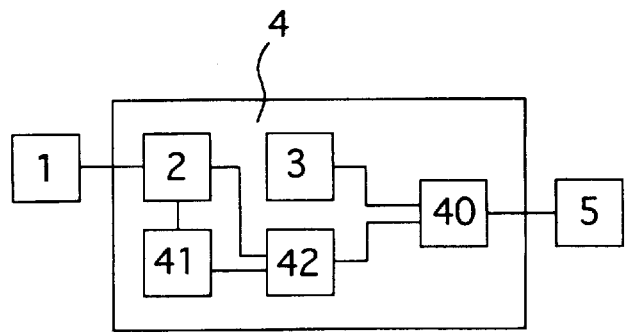
FIG. 1 is a control block diagram showing the details of the control of the automatic shift-down apparatus for an automatic transmission according to the embodiment of the present invention.

As shown in FIG. 1, an automatic shift-down apparatus for an automatic transmission according to the present embodiment comprises vehicle speed detection means 1 for detecting the speed of a vehicle, a controller 4, and a shift device 5. The controller 4 includes vehicle-speed variation rate calculation means 2 for calculating the variation rate of the detected vehicle speed; shift-start vehicle speed calculation means 3 for calculating, on the basis of the calculated vehicle-speed variation rate and a time required to complete a shift operation, a shift-start vehicle speed which enables the shift operation to finish before the vehicle speed attains a shift-completion speed; and a computation section 40 which performs calculations for realizing the vehicle-speed variation rate calculation means 2 and the shift-start vehicle speed calculation means 3, as well as other calculations. The shift device 5 starts a shift operation when the detected vehicle speed attains the calculated shift-start vehicle speed.

Figure 2:
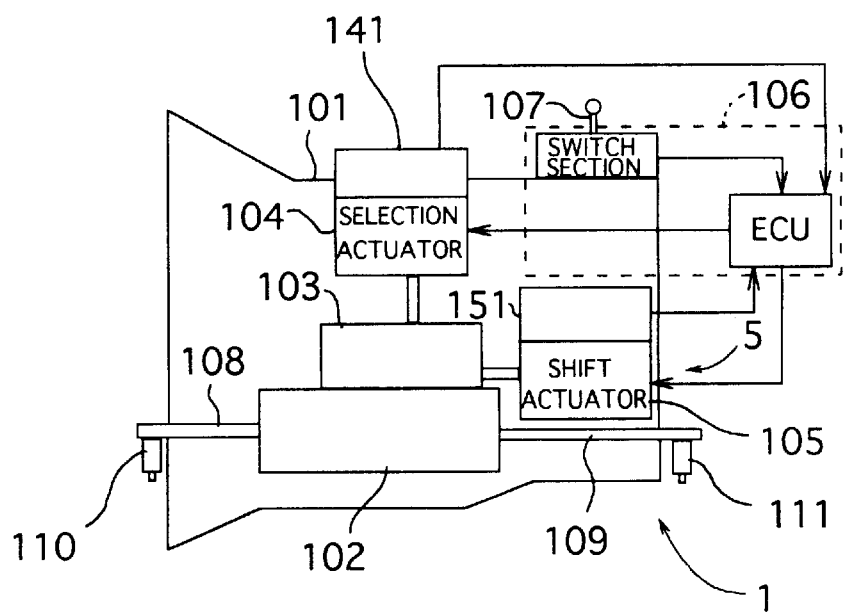
FIG. 2 is a block diagram showing an automatic transmission to which the apparatus of the present embodiment is applied.

FIG. 2 schematically shows an exemplary structure of an automatic-operation transmission according to the present invention. The automatic-operation transmission shown in FIG. 2 comprises a gear transmission mechanism 102 accommodated within a transmission casing 101; an operation mechanism 103 which switches the combination of meshed gears (transmission state) of the gear transmission mechanism 102; actuators 104 and 105 for driving the operation mechanism 103 hydraulically and/or electrically; and control means 106 for controlling the actuators 104 and 105.

The control means 106 drives the actuators 104 and 105 in accordance with signals from a manual member 107, such as a switch or lever. The control means 106 is realized by a hydraulic controller when the actuators 104 and 105 are of a hydraulic type and is realized by an ECU or a like when the actuators 104 and 105 are electric motors.

As detection means, there are provided stroke sensors 141 and 151 for detecting the positions of the actuators 104 and 105, an input-shaft rotation sensor 110 for detecting rotation of an input shaft, and an output-shaft rotation sensor 111 for detecting rotation of an output shaft. Detection signals from these sensors are output to the ECU.

The automatic-operation transmission shown in FIG. 2 is assumed to use a manual transmission. The gear transmission mechanism 102 of such a manual transmission is set (or shifted) to have one of predetermined gear ratios, through an operation of the operation mechanism 103 in order to change the transmission state of a constant-mesh gear train disposed on an input shaft 108 and a counter/output shaft (driven shaft) 109.

The operation mechanism 103 is mainly composed of a synchromesh mechanism in which relative braking is effected between cone friction surfaces, and a shift fork which is in engagement with the sleeve of the synchromesh mechanism.

The vehicle speed detection means 1 for detecting vehicle speed is formed of the output shaft rotation sensor 111 connected to the ECU, which constitutes the controller 4.

The vehicle-speed variation rate calculation means 2 functions as first vehicle-speed variation rate calculation means for calculating the variation rate of vehicle speed when the detected vehicle speed has attained the calculated shift-start vehicle speed, and as second vehicle-speed variation rate calculation means for calculating the variation rate of vehicle speed after the vehicle speed has attained the calculated shift-start vehicle speed.

Vehicle-speed variation rate storage means 41 is constituted by RAM resident within the ECU and adapted to store the vehicle-speed variation rate at the time of attainment of the shift-start vehicle speed.

Comparison means 42 compares the vehicle-speed variation rate after attainment of the shift-start vehicle speed with the vehicle-speed variation rate at the time of attainment of the shift-start vehicle speed stored in the vehicle-speed variation rate storage means 41.

The speed of the shift operation is switched or controlled in accordance with the result of comparison performed by the comparison means 42; i.e., depending on which is greater; the vehicle-speed variation rate after attainment of the shift-start vehicle speed or the vehicle-speed variation rate at the time of attainment of the shift-start vehicle speed.

When the calculated vehicle-speed variation rate indicates that the vehicle accelerates after initiation of the shift operation, the transmission is shifted to a gear in response to the vehicle speed.

The automatic shift-down method performed in the automatic shift-down apparatus for an automatic transmission according to the present embodiment having the above-described configuration is characterized in that vehicle speed is detected; the variation rate of the detected vehicle speed is calculated; on the basis of the calculated vehicle-speed variation rate and a time required to complete a shift operation, a shift-start vehicle speed is calculated such that the shift operation can finish before the vehicle speed attains a shift-completion speed; and a shift operation is started when the detected vehicle speed attains the calculated shift-start vehicle speed.

Figure 3:
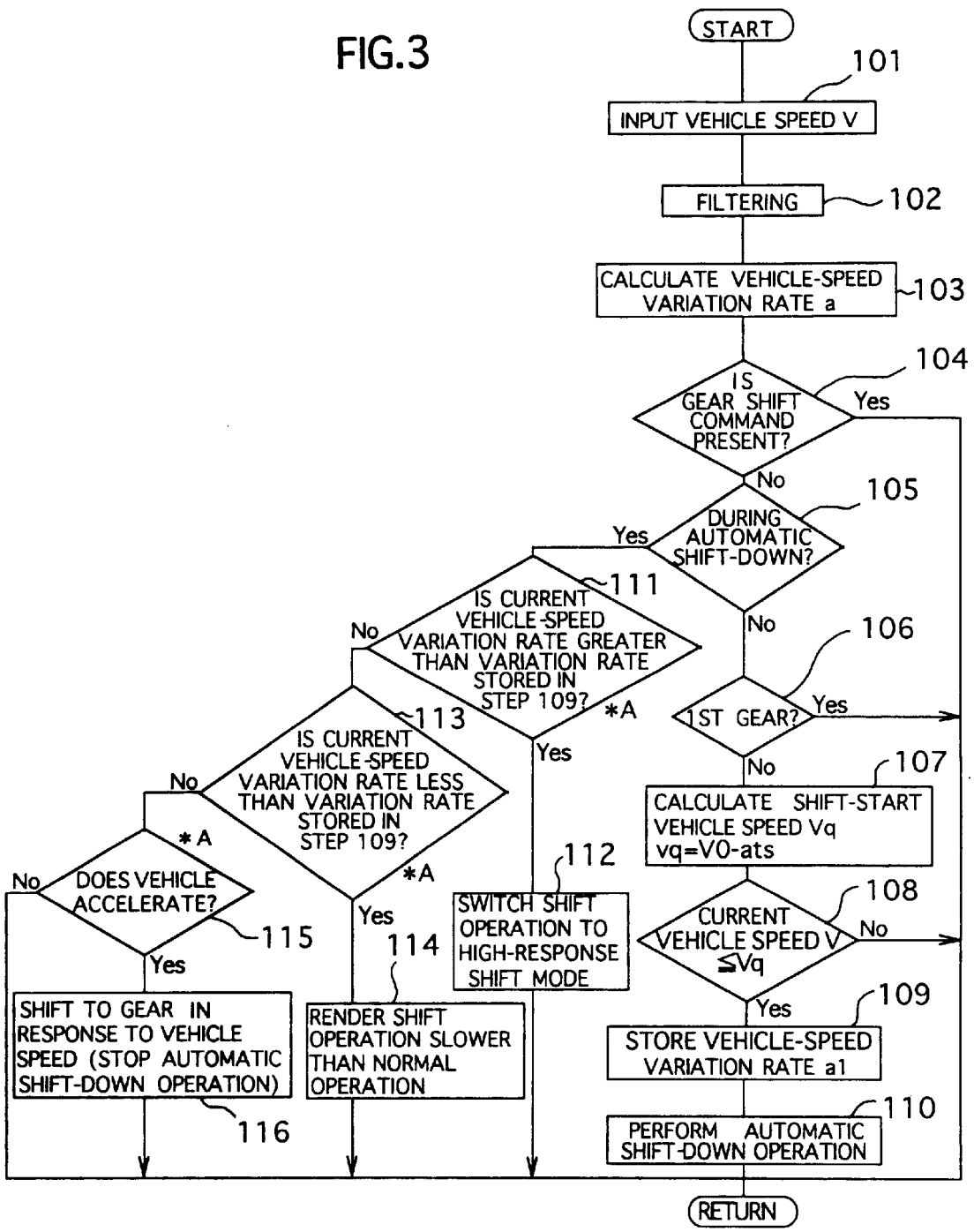
FIG. 3 is a flowchart showing the control steps of the apparatus of the present embodiment.

The present embodiment will be described in further detail with reference to a flowchart of FIG. 3, which shows the control steps of the present embodiment.

In step 101, a vehicle speed is detected by use of the output shaft rotation sensor 111, and in step 102, the detected vehicle speed undergoes a filtering process.

In step 103, the variation rate a (deceleration) in vehicle speed is calculated, and in step 104, a judgment is made as to whether a gear shift command is present. When the gear shift command is not present, in step 105, a judgment is made as to whether an automatic shift-down operation is currently being performed.

When an automatic shift-down operation is not being performed, it is judged in step 106 whether the transmission is in first gear. When the transmission is not in first gear, in step 107, a shift-start vehicle speed Vq is calculated on the basis of the calculated vehicle-speed variation rate and a shift operation time Ts, such that the shift operation will finish before the vehicle speed reaches a shift-completion speed V0.

Figure 4:
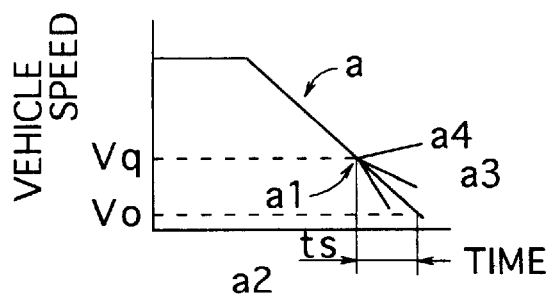
FIG. 4 is a time chart showing the principle of the control of the apparatus of the present embodiment, as well as variation after the vehicle speed has attained the shift-start vehicle speed.

In step 108, a judgment is made as to whether the present vehicle speed V is equal to or less than the shift-start vehicle speed Vq obtained in the above-described manner. When the present vehicle speed V is equal to or less than the shift-start vehicle speed Vq, in step 109, a current variation rate a1 of the vehicle speed V shown in FIG. 4 is stored in the vehicle-speed variation rate storage means 41. Subsequently, in step 110, an automatic shift-down operation is performed. As a result, when the vehicle speed reaches the shift-completion speed V0, the transmission T/M comes into a wait state in an arbitrary gear (or a shift stage). Thus, drive feeling (response) at the time of resuming travel can be improved.

However, the above-described control is performed on the premise that the vehicle-speed variation rate a is constant during the shift-down operation. Therefore, there is a possibility that the shift operation is not completed even when the vehicle speed has reached the shift-completion speed V0, if the vehicle-speed variation rate a increases due to strong braking or any other cause during the shift operation.

In order to solve this problem, when the vehicle-speed variation rate during the automatic shift-down operation increases to a2, which is greater than the vehicle-speed variation rate a1 at the beginning of the automatic shift-down operation, the shift operation is switched to a high-response operation mode, such that the shift operation is completed without fail before the vehicle speed reaches the shift-completion vehicle speed V0.

Specifically, when it is judged in step 105 that an automatic shift-down operation is currently being performed, in step 111, a judgment is made as to whether the present vehicle-speed variation rate is greater than the variation rate a1 of the vehicle-speed V, which was stored in the vehicle-speed variation rate storage means 41 when the vehicle speed had been judged to become lower than the shift-start vehicle speed Vq.

When the present vehicle-speed variation rate a2 is greater than the variation rate a1 of the vehicle-speed V as shown in FIG. 4 (when the degree of deceleration increases), in step 112, the shift operation is switched to a high-response operation mode.

Further, in step 113, a judgment is made as to whether the present vehicle-speed variation rate is less than the variation rate a1 of the vehicle-speed V, which was stored in the vehicle-speed variation rate storage means 41 when the vehicle speed had been judged to become lower than the shift-start vehicle speed Vq.

When the present vehicle-speed variation rate a3 is less than the variation rate a1 of the vehicle-speed V as shown in FIG. 4 (when the degree of deceleration decreases), in step 114, the shift operation is made slower than the normal shift operation.

Further, when it is detected in step 115 that the vehicle comes into an accelerating state a4 (the vehicle speed increases) as shown in FIG. 4, the automatic shift-down operation is stopped in step 116, and the transmission is shifted to a gear in response to the vehicle speed.

In the automatic shift-down apparatus for an automatic transmission according to the present embodiment which provides the above-described action, the vehicle speed detection means 1 detects the speed of a vehicle; the vehicle-speed variation rate calculation means 2 calculates the variation rate of the detected vehicle speed; the shift-start vehicle speed calculation means 3 calculates, on the basis of the calculated vehicle-speed variation rate and a time required to complete a shift operation, a shift-start vehicle speed which enables the shift operation to finish before the vehicle speed attains a shift-completion speed; and the shift device 5 starts a shift operation when the detected vehicle speed attains the calculated shift-start vehicle speed. Therefore, the automatic shift-down apparatus for an automatic transmission according to the present invention has an advantage such that the operation time (or the speed) of the automatic shift-down operation can be switched depending on the variation rate of vehicle speed.

That is, in the apparatus of the present embodiment, through the above-described automatic shift-down operation, the transmission T/M comes into a wait sate in an arbitrary gear after the vehicle speed has reached the shift-completion vehicle speed V0. Therefore, drive feeling (response) at the time of resuming travel can be improved.

Further, in the automatic shift-down apparatus for an automatic transmission for an automatic transmission according to the present embodiment, the speed of the shift operation is switched or controlled in accordance with the result of comparison performed by the comparison means 42; i.e., depending on whether the vehicle-speed variation rate a2, a3 after attainment of the shift-start vehicle speed is greater or less than the vehicle-speed variation rate a1 at the time of attainment of the shift-start vehicle speed. Therefore, the automatic shift-down operation can be performed at an optimal timing which is determined on the basis of driving conditions, to thereby improve drive feeling.

More specifically, when the vehicle-speed variation rate a2 after attainment of the shift-start vehicle speed is greater than the variation rate a1 of the vehicle-speed V as shown in FIG. 4 (when the degree of deceleration increases), in step 112, the shift operation is switched to a high-response operation mode; and when the vehicle-speed variation rate a3 after attainment of the shift-start vehicle speed is greater than the variation rate a1 of the vehicle-speed V as shown in FIG. 4 (when the degree of deceleration decreases), in step 114, the shift operation is made slower than the normal shift operation. Therefore, the automatic shift-down operation can be performed at an optimal timing which is determined on the basis of driving conditions, to thereby improve drive feeling.

Furthermore, in the automatic shift-down apparatus for an automatic transmission according to the present embodiment, when it is detected from the calculated vehicle-speed variation rate that the vehicle comes into an accelerating state a4 after the initiation of the shift operation, the transmission is shifted to a gear in response to the vehicle speed. Therefore, gear shift can be performed in accordance with driving conditions.

Specifically, when it is detected that the vehicle comes into an accelerating state a4 (the vehicle speed increases) as shown in FIG. 4, in step 116, the automatic shift-down operation is stopped, and the transmission is shifted to a gear in response to the vehicle speed.

In the automatic shift-down method for an automatic transmission according to the present embodiment, the variation rate of a detected vehicle speed is calculated; on the basis of the calculated vehicle-speed variation rate and a time required to complete a shift operation, a shift-start vehicle speed is calculated such that the shift operation can finish before the vehicle speed attains a shift-completion speed; and a shift operation is started when the detected vehicle speed attains the calculated shift-start vehicle speed. Therefore, the automatic shift-down method according to the present invention has an advantage such that the operation time (or the speed) of the automatic shift-down operation can be switched depending on the variation rate of vehicle speed.

The preferred embodiments of the present invention, as herein disclosed, are taken as some embodiments for explaining the present invention. It is to be understood that the present invention should not be restricted by these embodiments and any modifications and additions are possible so far as they are not beyond the technical idea or principle based on descriptions of the scope of the patent claims.

What is claimed is:

1. An automatic shift-down apparatus for an automatic operation of a manual transmission, characterized by comprising:

vehicle speed detection means for detecting the speed of a vehicle;

vehicle speed variation rate calculation means for calculating the variation rate of the detected vehicle speed;

shift-start vehicle speed calculation means for calculating, on the basis of the calculated vehicle-speed variation rate and a time required to complete a shift operation, a shift-start vehicle speed which enables the shift operation to finish before the vehicle speed attains a speed for completing the shift operation; and a shift device which starts a shift operation when the detected vehicle speed attains the calculated shift-start vehicle speed.

2. An automatic shift-down apparatus for an automatic transmission according to claim 1, characterized by further comprising first vehicle-speed variation rate calculation means for calculating the first variation rate of vehicle speed when the detected vehicle speed has attained the calculated shift-start vehicle speed.

3. An automatic shift-down apparatus for an automatic transmission according to claim 2, characterized by further comprising vehicle-speed variation rate storage means for storing the calculated vehicle-speed variation rate of the vehicle speed when the detected vehicle speed has attained the calculated shift-start vehicle speed.

4. An automatic shift-down apparatus for an automatic transmission according to claim 3, characterized by further comprising second vehicle-speed variation rate calculation means for calculating the second variation rate of vehicle speed after the detected vehicle speed has attained the calculated shift-start vehicle speed.

5. An automatic shift-down apparatus for an automatic transmission according to claim 4, characterized by further comprising comparison means for comparing the second calculated vehicle-speed variation rate after the detected vehicle speed has attained the calculated shift-start vehicle speed with the first calculated vehicle-speed variation rate stored in said vehicle-speed variation rate storage means.

6. An automatic shift-down apparatus for an automatic transmission according to claim 5, further comprising shift speed control means for controlling the speed of the shift operation in accordance with the result of comparison performed by said comparison means which indicates whether the second vehicle-speed variation rate after attainment of the shift-start vehicle speed is greater or less than the first vehicle-speed variation rate at the time of attainment of the shift-start vehicle speed.

7. An automatic shift-down apparatus for an automatic transmission according to claim 6, characterized in that when the calculated vehicle-speed variation rate indicates that the vehicle comes into an accelerating state after the initiation of the shift operation, the transmission is shifted to a gear in response to the vehicle speed.

8. An automatic shift-down method for an automatic operation of a manual transmission, comprising:

calculating the variation rate of the detected vehicle speed;

calculating a shift-start vehicle speed which enables the shift operation to finish before the vehicle speed attains a speed for completing the shift operation, on the basis of the calculated vehicle speed variation rate and a time required to complete a shift operation; and starting a shift operation when the detected vehicle speed attains the calculated shift-start vehicle speed.

9. An automatic shift-down apparatus for an automatic transmission according to claim 7, characterized in that said automatic transmission comprises a gear transmission mechanism accommodated within a transmission casing, an operation mechanism which switches the combination of meshed gears of the gear transmission mechanism, actuator for driving the operation mechanism hydraulically and electrically, and control means for controlling said actuators.

10. An automatic shift-down apparatus for an automatic transmission according to claim 9, characterized in that said vehicle speed detection means comprise an output-shaft rotation sensor for detecting rotation of an output shaft of said gear transmission mechanism.

11. An automatic shift-down apparatus for an automatic transmission according to claim 10, characterized by further comprising an input-shaft rotation sensor for detecting rotation of an input shaft of said gear transmission mechanism.

12. An automatic shift-down apparatus for an automatic transmission according to claim 11, characterized by further comprising stroke sensors for detecting the positions of shift and select actuators.

13. An automatic shift-down apparatus for an automatic transmission according to claim 6, characterized in that said shift speed control means comprises switch means for switching to a high-response operation mode or a slow shift operation to be made slower than the normal shift operation in accordance with the result of comparing the second calculated vehicle-speed variation rate with the first calculated vehicle-speed operation rate.

* * * * *